United States Patent [19]

Farrington et al.

[11] 4,183,988

[45] Jan. 15, 1980

[54] SOLID ION-CONDUCTIVE ELECTROLYTE

[75] Inventors: Gregory C. Farrington, Clifton Park; Joseph L. Weininger, Schenectady, both of N.Y.

[73] Assignee: General Electric Company, Schenectady, N.Y.

[21] Appl. No.: 961,259

[22] Filed: Nov. 16, 1978

[51] Int. Cl.² ................................................ H01M 6/16
[52] U.S. Cl. ...................................... 429/193; 252/518
[58] Field of Search ................ 429/193, 251; 106/45, 106/62, 65, 73; 252/518, 500

[56] References Cited

U.S. PATENT DOCUMENTS

| | | | |
|---|---|---|---|
| 3,976,505 | 8/1976 | Parrington et al. | 136/83 R |
| 3,997,366 | 12/1976 | Davis, Jr. | 429/251 X |

OTHER PUBLICATIONS

"Monograin Layers," T. S. te Velde & G. W. M. T. van Helden, Phillips Technical Review, 29, pp. 238-242, 1968.

*Primary Examiner*—Charles F. LeFevour
*Attorney, Agent, or Firm*—Paul R. Webb, II; Joseph T. Cohen

[57] ABSTRACT

A solid ion-conductive electrolyte is described which comprises a polymer film, a plurality of solid polycrystalline ion-conductive particles embedded therein, and the particles exposed at both opposite surfaces of the film.

3 Claims, 1 Drawing Figure

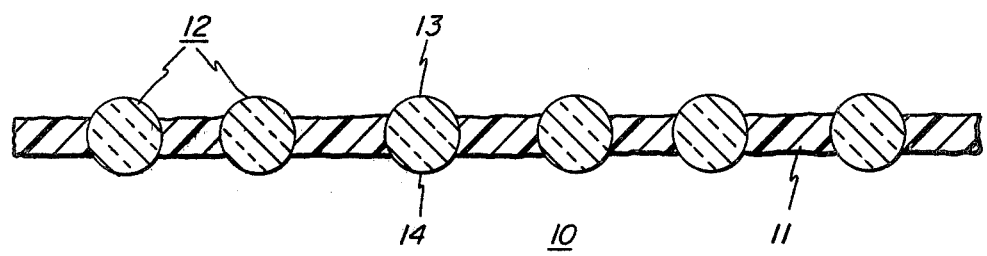

SOLID ION-CONDUCTIVE ELECTROLYTE

The present invention relates to polycrystalline solid ion-conductive electrolytes, and more particularly, to such electrolytes which are thin, flexible, heterogeneous films of solid polycrystalline ion-conductive electrolytes.

Such electrolytes are useful in electrochemical applications such as in a sealed lithium-bromine cell. Such a cell is described and claimed in U.S. Pat. No. 3,976,505-Farrington, et al issued Aug. 24, 1976, under the title "Sealed Lithium-Bromine Cell." This cell employs a lithium type cathode, a solid lithium sodium aluminate electrolyte, and a cathode of bromine in a non-aqueous solvent. Such electrolytes are useful in solid-state cells. This patent is assigned to the same assignee as the present application.

The term solid ion-conductive electrolyte as used in the present application includes beta-alumina, beta"-alumina and mixtures thereof. Suitable beta-aluminas and beta"-aluminas include sodium beta-alumina, lithium beta-alumina, potassium beta-alumina, hydronium beta-alumina, lithium-sodium aluminate, sodium beta"-alumina, lithium beta"-alumina, potassium beta"-alumina, and hydronium beta"-alumina.

Monograin polymer films and a method of preparing such films are set forth in an article entitled "Monograin Layers" by T. S. te Velde and G. W. M. T. van Helden on pages 238-242 in "Phillips Technical Review," 29, 238, 1968. The subject article describes on page 239 a monograin technique which employs monocrystalline grains of electronically conductive material insulated from each other by being embedded in a maximum monograin thick thermosetting resin sheet. The grains must protrude from one or both sides of the sheet. As it is discussed on page 238 of the subject article, prior to the monograin technique, the principal techniques used for manufacturing solid-state devices were the planar technique and the thin film or vacuum-evaporation technique. Such techniques employ single crystalline or monocrystalline material which is required for best operation in solid-state devices. The monograin technique of this article employs monocrystalline grains in a monograin thick plastic sheet thereby providing an improved technique over these former techniques.

Our present invention is directed to an improved solid ion-conductive electrolyte.

The primary object of our invention is to provide a thin, flexible, heterogeneous film of solid polycrystalline ion-conductive electrolytes.

In accordance with one aspect of our invention, a solid ion-conductive electrolyte includes a polymer film, a plurality of solid polycrystalline ion-conductive particles embedded therein, and the particles exposed at both opposite surfaces of the film.

These and various other objects, features and advantages of the invention will be better understood from the following description, taken in connection with the accompanying drawing in which:

The single FIGURE is a sectional view of a solid ion-conductive electrolyte made in accordance with our invention.

In the single FIGURE of the drawing, there is shown generally at 10 a solid ion-conductive electrolyte embodying our invention. Electrolyte 10 comprises a polymer film 11 with a plurality of solid polycrystalline ion-conductive particles 12 embedded in film 11. Particles 12 are exposed at both opposite surfaces of film 11 as shown at 13 and 14.

We attempted initially to form a solid ion-conductive electrolyte by employing the monograin layer technique as discussed in the above-identified article. As discussed in the Article, we selected single or monocrystalline grains of sodium beta-alumina which are ion-conductive particles. We attempted to form a monocrystalline device as described on page 239 of the above-identified article. The resulting structure had a polymer layer not more than one grain thick with a plurality of monocrystalline grains embedded therein, and the grains exposed at both opposite surfaces of the polymer layer. We tested this structure for ion-conductivity and found that the structure failed to exhibit the necessary ion-conductivity to provide a useful electrolyte. Thus, we were not successful in forming a monocrystalline device in accordance with the above-identified article using single crystals or monocrystalline grains of a different type of material, an ion-conductive electrolyte of beta-alumina.

However, we found that we could form a solid ion-conductive electrolyte employing a polymer film and ion-conductive particles. However, as opposed to the teaching in the article, we found that we had to employ polycrystalline as opposed to monocrystalline ion-conductive particles. We found that we could form a solid ion-conductive electrolyte which comprised a polymer film, a plurality of solid polycrystalline particles embedded therein, and the particles exposed at both opposite surfaces of the film. The resulting electrolyte of our invention is an improvement over that described in the above-identified U.S. Pat. No. 3,976,505, in that our electrolyte resulted in a thin, flexible, heterogenous film as opposed to the solid disc or tube as set forth in the subject patent. Our improved electrolyte is opposed to the teaching of the above-identified article in that the article described a technique to make monocrystalline devices employing single crystals of electronically conductive material in a monograin layer of polymer.

We found that we could form an improved electrolyte with polycrystalline ion-conductive particles as opposed to monocrystalline in a polymer layer resulting in a useful ion-conductive electrolyte as opposed to the monocrystalline device described in the subject article. We found that monocrystalline ion-conductive material of sodium beta-alumina was non-isotropic and thus, the employment of such single crystals of this material in accordance with the above article would not provide ion-conductivity. However, we found that with polycrystalline particles of ion-conductive material such as sodium beta-alumina, we were able to obtain grains which were isotropic and thus, provide the necessary ion-conductivity for the electrolyte. It will be appreciated that while we have employed the terms grains and particles in this application, such polycrystalline ion-conductive material can be in other forms and configurations such as spheres, etc.

We found that the plurality of solid polycrystalline ion-conductive particles can be selected from a variety of ion-conducting particles. Particularly suitable for employment in our invention are such particles which are selected from the class consisting of beta-aluminas, beta"-aluminas and mixtures thereof. The particles must be polycrystalline as opposed to single crystals or monocrystalline material. Various forms and configurations can be employed wherein the polycrystalline ion-conductive material is in the shape of particles or spheres. The polymer film which supports and separates the plurality of polycrystalline ion-conductive particles embedded therein can be selected from a wide variety of polymers such as, for example, polyesters or polyamides. The polymer selected depends on the proposed device in which the electrolyte will be employed. The particles must be exposed at both opposite surfaces of the polymer film for ion-conductivity therethrough. Such electrolytes are useful in a variety of electrochemical cells and solid-state cells.

In the formation of a solid electrolyte in accordance with our invention, a substrate has an adhesive of isoprene applied to its upper surface. The particles are sprinkled or otherwise deposited on the adhesive material, after which the loose surface particles are brushed off. A thermo-setting resin such as polyurethane is applied over and between the particles thereby adhering the particles to the adhesive layer on the substrate. The upper layer of the polymer is etched away in any suitable manner such as, for example, by solvent dissolution to expose the particles on this surface of the polymer film. The resin is hardened and the resulting polymer film containing the particles having exposed surfaces, is then stripped away from the substrate. The adhesive is removed in any suitable manner as, for example, by solvent dissolution to result in a solid ion-conductive electrolyte made in accordance with our invention. When the adhesive is stripped away, the particles will be exposed at the opposite surface of the film. The resulting electrolyte has a polymer film, a plurality of solid microcrystalline particles embedded therein and the particles exposed at both opposite surfaces of the film. It will be appreciated that a monograin layer of polymer as described in the above article would be insufficient as a supportive matrix for the particles. Other methods of preparing the electrolyte could also be employed. Such an electrolyte can be subsequently used as a solid ion-conductive electrolyte in an electrochemical cell or solid-state device.

Examples of solid ion-conductive electrolytes made in accordance with our invention are set forth in the following example:

EXAMPLE I

An adhesive layer of isoprene was applied to the upper surface of a substrate of Pyrex glass. A plurality of sodium beta-alumina polycrystalline ion-conductive particles were sprinkled on the surface of the adhesive. The loose surface particles were brushed off. A thermo-setting resin of polyurethane was applied on the upper surface of the particles thereby covering the particles and the spaces therebetween. Subsequently, the upper layer of the resin was etched away by applying thereto 1% potassium hydroxide in ethanol. The resin, after hardening to a polymer film, with the particles embedded therein and exposed at one surface thereof, were stripped from the substrate. The adhesive was dissolved by xylene thereby exposing the particles on the opposite surface of the film. The resulting structure was a solid ion-conductive electrolyte made in accordance with our invention.

While other modifications of the invention and variations thereof which may be employed within the scope of the invention have not been described, the invention is intended to include such as may be embraced within the following claims.

What we claim as new and desire to secure by Letters Patent of the United States is:

1. A solid ion-conductive electrolyte comprising a polymer film having opposite surfaces, a plurality of solid polycrystalline ion-conductive particles embedded therein, and the particles exposed at both opposite surfaces of the film said particles are selected from the group consisting of beta-aluminas, beta ''-aluminas, and mixtures thereof.

2. A solid ion-conductive electrolyte as in claim 1, in which the polymer film is polyester.

3. A solid ion-conductive electrolyte as in claim 1, in which the polymer film is polyurethane.